N. M. HOPKINS.
CIRCUIT CONTROLLER.
APPLICATION FILED AUG. 25, 1911.
1,058,587.
Patented Apr. 8, 1913.
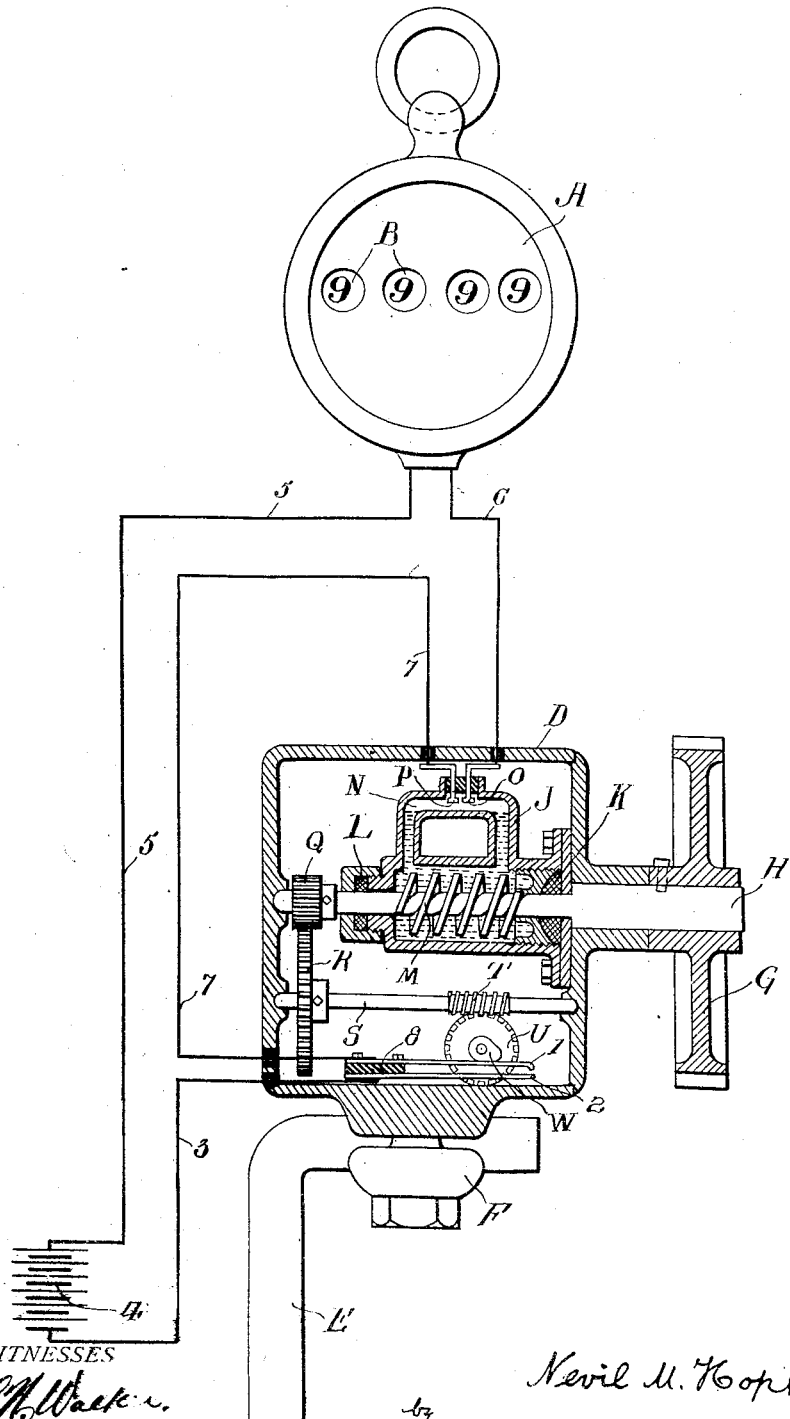
WITNESSES
INVENTOR
Nevil M. Hopkins
by Byrne, Townsend & Brickenstein Attorneys

UNITED STATES PATENT OFFICE.

NEVIL MONROE HOPKINS, OF WASHINGTON, DISTRICT OF COLUMBIA, ASSIGNOR, BY MESNE ASSIGNMENTS, TO THE ELECTRIC TACHOMETER COMPANY, OF PHILADELPHIA, PENNSYLVANIA, A CORPORATION OF NEW JERSEY.

CIRCUIT-CONTROLLER.

1,058,587.     Specification of Letters Patent.     Patented Apr. 8, 1913.

Application filed August 25, 1911. Serial No. 645,991.

*To all whom it may concern:*

Be it known that I, NEVIL MONROE HOPKINS, a citizen of the United States, residing at Washington, in the District of Columbia, have invented certain new and useful Improvements in Circuit-Controllers, of which the following is a specification.

My invention relates to a circuit controlling device, primarily intended for use with an electro-magnetically operated indicating device, such as a mile-counter, odometer, or analogous instrument; and has for its object to insure the breaking of the circuit whenever the mechanism to which the device is attached, is not in operation.

Referring to the accompanying drawing, A is a mile counter or odometer having a series of counters or indicators B, operated by an electro-magnetic device of any well known type.

4 is a battery for furnishing current to operate the electromagnet.

D is a dust-tight casing, adapted to be secured to the steering-knuckle E of an automobile by a clamping device F.

G is a gear adapted to be driven from a gear (not shown) connected to the wheel of the vehicle.

H is a shaft to which the gear G is secured, this shaft being mounted in the casing D as shown. This shaft H passes through a container J, which is secured to the inside of the casing D, suitable stuffing boxes K, L being provided to prevent the leakage of the mercury or other conducting liquid in the container. A screw M on the shaft H and within the container causes the mercury to flow, when the shaft is rotating through the conduit N, and thus electrically connect the terminals O, P.

Mounted on the shaft and driven thereby is a gear Q, meshing with a gear R on a shaft S carrying a worm T which in turn meshes with a worm-gear U, on whose shaft is a cam W arranged to cause the circuit closing spring pens 1 and 2 to close the circuit at each revolution of the worm-gear U. The spring pens 1, 2 are mounted as shown on an insulating block 8. A wire 3 leads from pen 2 to one side of the battery 4; a wire 5 from the other side of the battery to the electro-magnetic indicator A; a wire 6 from the indicator to contact O; and wire 7 from contact P to pen 1. Suitable insulating bushings are provided at the points where the wires enter the casing D.

The operation of the device is as follows:—When the shaft H is rotated, the screw M causes the mercury to circulate through the conduit N, thus closing the circuit between contacts O and P. The rotation of the shaft also causes the cam W to intermittently close the circuit at the pens 1, 2, which return to their normal open position as soon as they are released by the cam. The closures of the circuit cause the electro-magnetic device to operate the counters to indicate the number of revolutions of the shaft. It will thus be apparent that the battery circuit cannot be closed except when the shaft H is in motion, and the battery cannot become exhausted by the stoppage of the machinery with the pens or contacts 1, 2, in contact.

While I have described the device as applied to an automobile, it is obviously capable of use in connection with any mechanism in which it is desired to indicate the number of revolutions of a rotating part. It is further to be understood that for the particular form of intermittent circuit-closing mechanism, may be substituted any equivalent mechanism and that instead of a screw for circulating the mercury, any other form of pump may be used.

I claim:

1. The combination with a battery and its circuit, of a circuit closing device, mechanism for operating said device, and automatic means for cutting out the battery when the said mechanism is not in operation.

2. The combination of a battery and its circuit, a circuit-closing device in said circuit, mechanism for intermittently operating said circuit-closing device, and automatic mechanism for cutting out said battery when the said mechanism is not in operation.

3. The combination of a battery and its circuit, of a circuit-closing device in said circuit, mechanism for intermittently operating said circuit-closing device, open circuit terminals in said circuit, and automatic means for closing the circuit at said terminals only when said mechanism is in operation.

4. The combination of a battery and its circuit, of a circuit-closing device in said circuit, mechanism for intermittently operating said circuit-closing device, open circuit terminals in said circuit, and means arranged to be operated by said mechanism for closing the circuit at said terminals only when said mechanism is in operation.

5. The combination of a battery and its circuit, of a circuit-closing device in said circuit, mechanism for intermittently operating said circuit-closing device, open circuit terminals in said circuit, a conduit into which said terminals project, and means arranged to be operated by said mechanism for forcing a conducting liquid through said conduit to electrically connect said terminals.

6. The combination of a battery and its circuit, of a circuit-closing device in said circuit, mechanism for intermittently operating said circuit-closing device, open circuit terminals in said circuit, a conduit into which said terminals project, a liquid container to which said conduit connects, and a liquid forcing means in said container arranged to be operated by said mechanism for forcing a conducting liquid through said conduit to electrically connect said terminals.

7. The combination of a battery and its circuit, of a circuit-closing device in said circuit, mechanism for intermittently operating said circuit-closing device comprising a shaft, a liquid container through which said shaft passes, a screw on said shaft, a conduit connected at each end to said container, and circuit-terminals extending into said conduit.

8. A circuit controller comprising a casing, circuit-closing contacts therein, a shaft and means geared thereto for closing said contacts, a liquid container through which said shaft passes, a conduit above said container and connected at each end thereto, circuit terminals extending into said conduit, and a screw on said shaft and within the casing.

9. A circuit controller comprising a casing, circuit-closing contacts therein, a shaft and means geared thereto for intermittently closing said contacts, a liquid container having a closed conduit connected thereto, circuit terminals extending into said conduit, and means connected to said shaft for causing liquid to circulate through said conduit.

10. A circuit-closing device comprising a conduit closed on itself, circuit terminals extended into the upper portion of said conduit, a conducting liquid partly filling said chamber but not in contact with said terminals when the liquid is at rest, and means adapted to cause a circulation of liquid through said conduit past said terminals.

In testimony whereof I affix my signature in presence of two witnesses.

NEVIL MONROE HOPKINS.

Witnesses:
H. WOODS,
T. KETCHUM.